(12) United States Patent
Gasco Nunez

(10) Patent No.: US 8,328,139 B2
(45) Date of Patent: Dec. 11, 2012

(54) METHOD AND DEVICE FOR IN-FLIGHT REFUELLING OPERATIONS USING A BOOM

(75) Inventor: Miguel Gasco Nunez, Getafe (ES)

(73) Assignee: EADS Construcciones Aeronauticas, S.A., Madrid (ES)

( * ) Notice: Subject to any disclaimer, the term of this patent is extended or adjusted under 35 U.S.C. 154(b) by 511 days.

(21) Appl. No.: 12/478,202

(22) Filed: Jun. 4, 2009

(65) Prior Publication Data

US 2010/0243812 A1 Sep. 30, 2010

(30) Foreign Application Priority Data

Mar. 31, 2009 (ES) .................................. 200900884

(51) Int. Cl.
*B64D 39/00* (2006.01)
(52) U.S. Cl. .................................. 244/135 A
(58) Field of Classification Search ............. 244/135 A, 244/1 TD, 135 R, 136, 130, 45 R
See application file for complete search history.

(56) References Cited

U.S. PATENT DOCUMENTS

| | | | | |
|---|---|---|---|---|
| 2,663,523 A | * | 12/1953 | Leisy | 244/135 A |
| 4,129,270 A | * | 12/1978 | Robinson et al. | 244/135 A |
| 7,878,455 B2 | * | 2/2011 | Adarve Lozano | 244/135 A |

* cited by examiner

*Primary Examiner* — Tien Dinh
*Assistant Examiner* — Valentina Xavier
(74) *Attorney, Agent, or Firm* — Oblon, Spivak, McClelland, Maier & Neustadt, L.L.P.

(57) ABSTRACT

A method and device for in-flight including movable aerodynamic surfaces boom refueling operations using an articulated boom and a cable is disclosed. The method includes: (a) from a completely stowed-away and retracted position of the boom, the cable is initially released, thereby starting to lower the boom, such that the said cable is kept tensioned during the whole of step (a) by the force supplied by the movable aerodynamic surfaces and/or the force of gravity acting on the boom; (b) after reaching the maximum deployed position of the boom, or the bottom end of the flight envelope of the boom, release of the cable is stopped; (c) while keeping the length of released cable fixed, the boom is brought into a suitable position for commencing the maneuvers for refueling of the receiver aircraft; (d) the manoeuvre for connecting the boom to the receptacle of the receiver aircraft is started by control of the movable aerodynamic surfaces; and (e) once the connection has been established, the transfer of fuel to the receiver aircraft is started.

7 Claims, 2 Drawing Sheets

METHOD AND DEVICE FOR IN-FLIGHT REFUELLING OPERATIONS USING A BOOM

FIELD OF THE INVENTION

The present invention relates to a method for performing operations for in-flight refuelling of an aircraft using an articulated boom and to a device for carrying out said operations.

PRIOR ART

One of the methods which are used at present for in-flight refuelling of an aircraft is based on the use of an arm-like device or "boom" equipped with a telescopically extendable internal section by means of which fuel is transferred from the tanker aircraft to the receiver aircraft. The boom is joined to the tanker aircraft by means of an articulated system.

Thus, the boom essentially consists of a structural member articulated at the rear of the fuselage of the tanker aircraft and with an extendable internal telescopic part. This boom is attached to the tanker aircraft in a stowed-away position with its telescopic part retracted. When the in-flight refuelling operation from the tanker aircraft to the receiver aircraft is to be started, the boom is deployed from the tanker aircraft and the telescopic part is extended by a certain amount into its nominal position. The boom has aerodynamic control surfaces along its structural member which are controlled by the operator so as to be able to direct said boom towards the receptacle of the receiver aircraft. The above system comprises moreover a cable which is attached to the boom and which is wound up onto a drum situated inside the tanker aircraft. During the refuelling operation the boom is moved by the aerodynamic surfaces, while the cable is released or wound up onto its drum by means of a motor and a control system so as to ensure that the said cable is kept tensioned all times and has the correct length without, however, preventing free movement of the boom during the connection and replenishing manoeuvres. This is the normal mode of operation of all refuelling systems operating with a boom.

According to the present state of the art various systems which use operation of an articulated boom in order to perform in-flight refuelling operations are known. Thus, for example, the document EP 1361156 describes an improved actuator for deploying the boom, which comprises an electric motor and a control system for selectively powering the electric motor and thus varying the length of the cable connected to the boom, this system comprising moreover circuit components for limiting the speed of the motor. A system such as that described in the document EP 1361156 and generally the systems present in the known tanker aircraft have various drawbacks:

- the movement dynamic of the boom due to its aerodynamic control surfaces on some occasions is greater than that which can be achieved with the automatic cable release and wind-up system, resulting in tugging which negatively affects the flying performance of the boom;
- in the event of a fault affecting the automatic cable system, catching of the cable occurs and may affect the safety of the operation during flying;
- the cable wind-up and release system is very complex so that it is necessary to take into account all the possible fault situations which may affect it;
- since the operating mode requires a very high rotational torque or actuating force of the lifting device as well as the capacity to raise and lower the arm at a very fast speed, the system must satisfy certain requirements with regard to the motor and the associated parts and circuits, with the result that it has large size and weight and high cost.

The present invention solves the above-mentioned drawbacks.

SUMMARY OF THE INVENTION

According to a first aspect, the invention provides a method for performing in-flight refuelling operations between a tanker aircraft and a receiver aircraft, using an articulated boom which comprises movable aerodynamic surfaces and using a cable, said method comprising the following steps:

a) from a completely stowed-away and retracted position of the boom, the cable is initially released, thereby starting to lower the boom, such that the cable is kept constantly tensioned for the duration of this operation owing to the force supplied by the movable aerodynamic surfaces and/or owing to the force of gravity acting on the said boom;

b) after reaching the maximum deployed position of the boom, or the bottom end of the flight envelope of the boom, "flight envelope" being understood here as meaning the set of positions which the boom may assume during its flight controlled by aerodynamic surfaces, release of the cable is stopped;

c) while keeping the length of released cable fixed, the boom is brought into a suitable position for commencing the manoeuvres for refuelling of the receiver aircraft, with the cable being subject to a very low tension, only that due to the aerodynamic forces acting on the cable, and determining the flying performance of the boom by controlling the movable aerodynamic surfaces which may preferably make use of the associated aerodynamic laws for control of the boom;

d) the manoeuvre for connecting the boom to the receptacle of the receiver aircraft is started by operating the movable aerodynamic surfaces of the boom;

e) once the connection has been established, the transfer of fuel from the tanker aircraft to the receiver aircraft is started.

According to a second aspect, the invention provides a device for in-flight refuelling operations using a boom, said boom comprising movable aerodynamic surfaces, said device comprising a cable which connects the boom to the tanker aircraft, means for extending and winding up said cable, and means for detecting the tension of the cable at some of its points. The cable has a flexural rigidity and resilient properties which, in combination with its cross-section, enable it, once extended, to form a substantially flat curve resulting from the aerodynamic action of the air and the tension at both ends of the cable, varying its shape depending on the position of the boom at each moment during the operation.

Further characteristic features and advantages of the present invention will emerge from the detailed description which follows with reference to the accompanying figures.

DETAILED DESCRIPTION OF THE INVENTION

Figure 1:
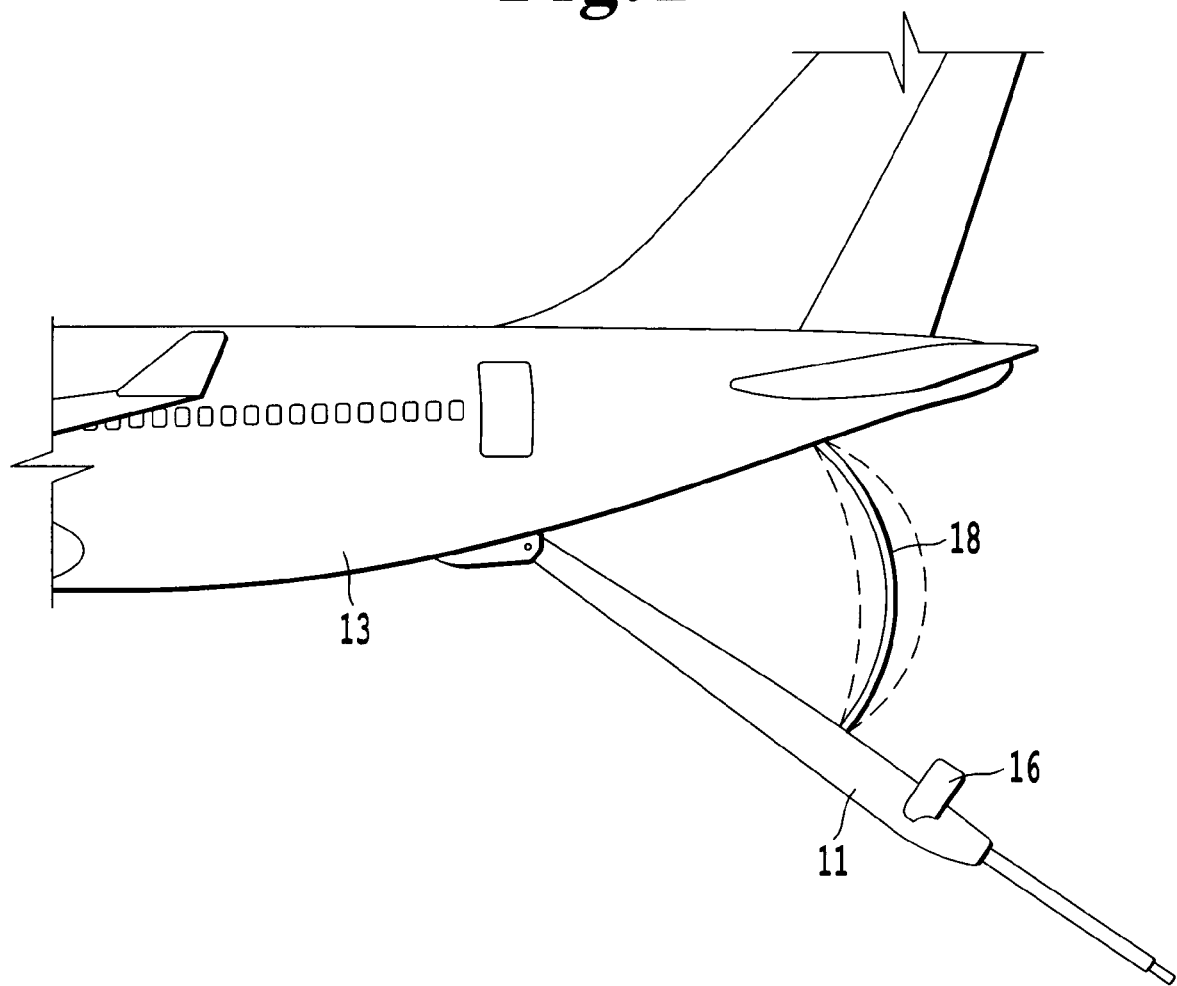
FIG. 1 shows a diagram illustrating the device for in-flight refuelling operations using a boom, according to the invention, during the in-flight refuelling operation.
Figure 2:
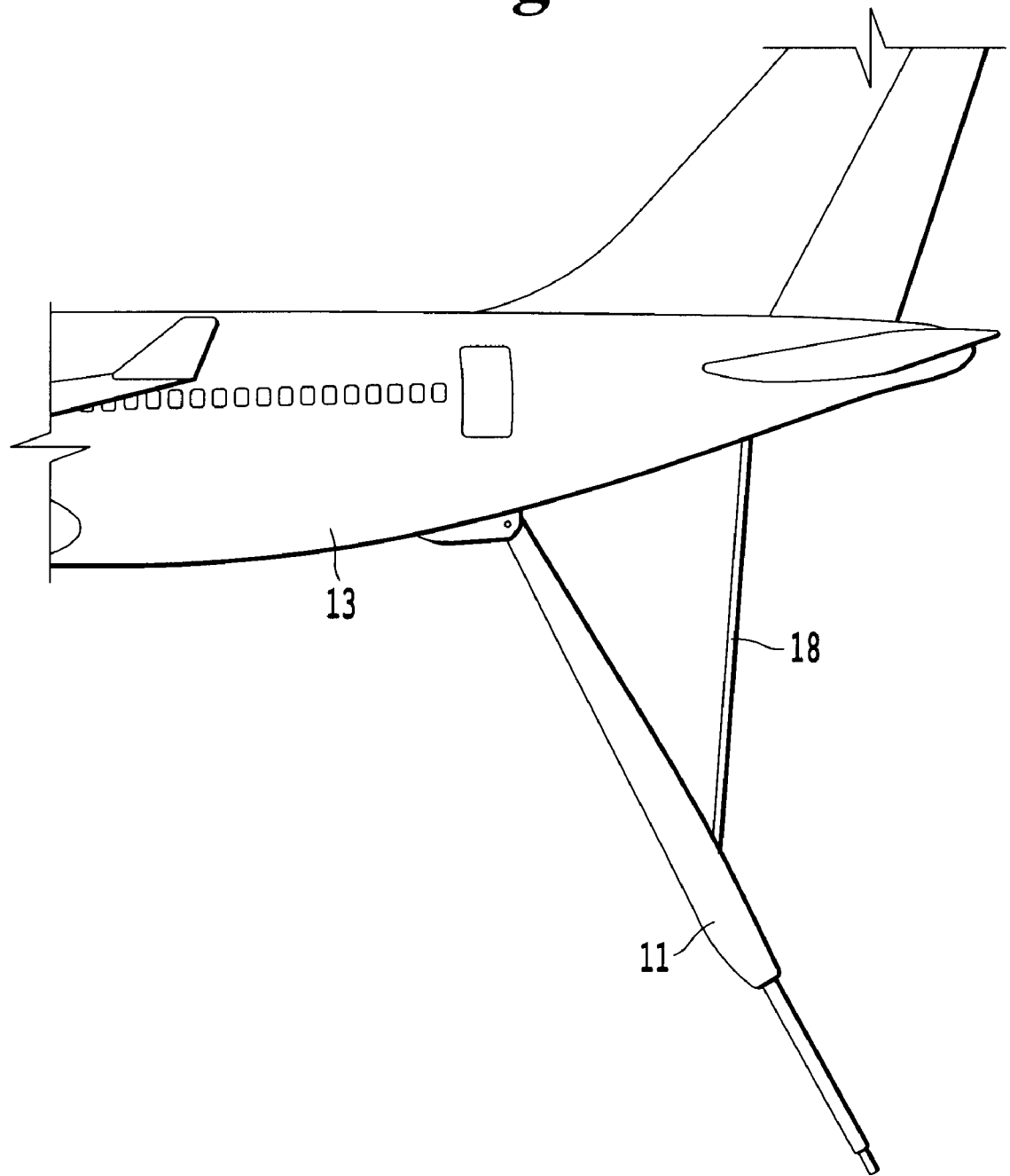
FIG. 2 shows a diagram illustrating the device for in-flight refuelling operations using a boom, according to the invention, with the device totally deployed.

The invention thus provides a method for performing in-flight refuelling operations between a tanker aircraft 13 and a receiver aircraft, using an articulated boom 11 which comprises movable aerodynamic surfaces 16, typically fins, and using a cable 18, said method comprising the following steps:

a) During the operation where the boom 11 is deployed, the cable 18 is released from the drum on which it is wound up so that the said cable 18 is kept constantly tensioned by means of the suitable movement of the control surfaces 16. Said control surfaces 16 may be controlled by means of a control system based on aerodynamic laws.

b) After reaching the maximum deployed position of the boom 11, or the bottom end of the flight envelope of said boom 11, release of the cable 18 is stopped.

c) From the position reached in step b), the boom 11 is brought into the position suitable for commencing the maneuvers for refuelling of the receiver aircraft: this may be optionally performed automatically by means of a law-based system for controlling the boom 11.

d) The system for winding up and releasing the cable 18 is not operated again until the receiver aircraft refuelling operation has been completed and the operation for hoisting the boom 11 is started. During the in-flight refuelling operation (FIG. 1), the cable 18 will form a curve resulting from the aerodynamic action of the air on said cable, the shape of which will vary depending on the position of the boom 11 at each moment during operation, being substantially straight when said boom 11 is in the lowest position of the envelope or totally deployed (FIG. 2), this position coinciding with that reached in step b), when release of the cable 18 is stopped.

The main characteristic features which allow the device and method according to the invention to be realized are summarised below.

The cable 18 has a flexural rigidity sufficient to allow release and winding up of the boom 11, while preventing any formation of knots during flying. This is achieved by means of a suitable combination of the diameter of its cross-section and the type of material used which are able to provide it with resilient and flexural rigidity properties which allow a minimum radius of curvature without any damage or permanent deformation. Thus, said minimum radius of curvature of the cable without any damage or permanent deformation affecting it may range between 1 cm and 40 cm and in a preferred embodiment between 5 cm and 40 cm. The cable 18 has preferably a rigidity ranging between 1960 $N/mm^2$ and 2160 $N/mm^2$. The most suitable materials for forming the cable include steel or fibers, such as KEVLAR® or VECTRAN®. Steel cables are generally formed by a set of steel wires or iron strands which form a single body. These wires may be rolled up helically in one or more layers, generally around a central wire, forming the spiral cables. These cables, in turn, may be rolled up helically around a core or centre piece, forming the named multiple-cord cables. The core or centre piece may consist of steel or fibre. Assuming the same design and cross-section the cables with a fibre core are lighter than those with a steel core, although steel-core cables have a greater elastic modulus.

In order to be able to carry out the process described in the method for operation of the boom 11 according to the invention, very precise control of the position of the boom 11 is required: the slack cable 18 will not hinder the aforementioned in-flight refuelling operation if the position of the boom 11 is sufficiently well controlled to bring the boom 11 into the desired position for performing refuelling in a precise manner and without any oscillating movements. To achieve this, it is preferable to use a law-based system for controlling the boom 11 with a special operating mode for deploying and raising the boom 11 such that operation can be reliably automated, moreover without the operator having to worry about whether the maximum deployment envelope of the boom 11 has been reached.

The movement of the boom 11 when the cable 18 is very slack, namely during the steps c) and d) (FIG. 1), is as the result of the balance of forces between, on the one hand, the resistance which the air exerts on said cable 18 and on all the surfaces of the boom 11 and which, ultimately, tends generally to raise the boom 11 and, on the other hand, the weight of the boom 11 and the action of the movable aerodynamic surfaces 16. In the method and device according to the present invention it can be understood that the cable is always tensioned and that the tension will be high when the drum is operating and the cable is released or wound up, with a deliberate tension produced by the drum, and that the tension will be low, owing to the aerodynamic force of the cable itself, when the boom is flying with a fixed and excess length of extended cable so that the boom can move freely (steps c and d). Said high tension is greater than 300 kg, and may be as high as 4 tonnes, and the said low tension during free flight of the boom is less than 300 kg and on few occasions may fall below 50 kg.

Although the present invention has been described entirely in connection with preferred embodiments, it is evident that those modifications which fall within the scope of the following claims may be made, without this being regarded as limited by the above embodiments.

The invention claimed is:

1. A method for in-flight refuelling operations using an articulated boom and a cable, said boom comprising movable aerodynamic surfaces, said method comprising the following steps:
    a) releasing the cable from a completely stowed-away and retracted position of the boom, thereby starting to lower the boom, such that the said cable is kept tensioned during all of step a) by a force supplied by the movable aerodynamic surfaces and/or gravitational force acting on the boom;
    b) stopping the release of the cable after reaching a maximum deployed position of the boom or a bottom end of the flight envelope of the boom;
    c) bringing the boom into a suitable position for commencing maneuvers for refuelling of a receiver aircraft while keeping a length of released cable fixed;
    d) starting the maneuvers for connecting the boom to a receptacle of the receiver aircraft by control of the movable aerodynamic surfaces; and
    e) starting transfer of fuel to the receiver aircraft once the connection has been established.

2. The method according to claim 1, wherein in step c) the boom is brought into a suitable position for commencing the refuelling maneuvers by corresponding control using the movable aerodynamic surfaces.

3. The method according to claim 1 or 2, wherein a system for winding up and extension of the cable is not operated from the end of step b) to the start of the maneuver for hoisting the boom.

4. The method according to claim 1, wherein the position into which the boom is brought during step c) is a position substantially centred with respect to the flight envelope of the boom so as to allow movement of said boom in every direction.

5. The method according to claim 1, wherein all movements of the boom are controlled by an automatic system for controlling the movable aerodynamic surfaces by aerodynamic control laws.

6. The method according to claim 1, wherein during the in-flight refuelling operation, the cable forms a curve resulting from aerodynamic action of air and all forces acting on said cable, and from the weight of the boom and the action of the movable aerodynamic surfaces, the shape of which will vary depending on the position of the boom at each moment during the operation, being substantially straight when the boom is in the lowest position of the envelope or totally deployed.

7. The method according to claim 1, wherein, once fuel transfer to the receiver aircraft has been completed, a system for winding up and extension of the cable is started again in order to hoist the boom into its initial stowed-away rest position.

\* \* \* \* \*